(12) United States Patent
DeMarco (10) Patent No.: US 7,654,135 B2
(45) Date of Patent: Feb. 2, 2010

(54) MULTIPLE TRANSMISSION TEST SYSTEM AND METHOD

(75) Inventor: Frank Anthony DeMarco, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/153,339

(22) Filed: May 16, 2008

(65) Prior Publication Data

US 2009/0282904 A1  Nov. 19, 2009

(51) Int. Cl.
*G01M 13/02* (2006.01)
(52) U.S. Cl. .................................. 73/115.02
(58) Field of Classification Search .............. 73/115.02, 73/116.01, 116.04, 118.01; 74/473.19, 661, 74/665 L; 180/338, 365
See application file for complete search history.

(56) References Cited

U.S. PATENT DOCUMENTS

| | | | |
|---|---|---|---|
| 3,060,730 A | 10/1962 | Lucia | |
| 3,690,168 A | 9/1972 | Petersen | |
| 3,739,632 A | 6/1973 | Miller et al. | |
| 3,796,092 A | 3/1974 | Klinger et al. | |
| 4,274,278 A | 6/1981 | Patterson | |
| 4,285,233 A * | 8/1981 | Swis | 73/116.02 |
| 4,294,112 A | 10/1981 | Moore et al. | |
| 4,356,724 A * | 11/1982 | Ayoub et al. | 73/114.14 |
| 4,362,055 A | 12/1982 | Grobler | |
| 4,468,958 A * | 9/1984 | Takeshita | 73/115.02 |
| 4,520,659 A | 6/1985 | Lucia et al. | |
| 4,562,729 A * | 1/1986 | Maloney | 73/115.02 |
| 4,592,228 A * | 6/1986 | Lucia | 73/115.02 |
| 4,602,499 A * | 7/1986 | Norton et al. | 73/41 |
| 4,615,212 A * | 10/1986 | Kugler et al. | 73/162 |
| 4,628,746 A | 12/1986 | van Rooij | |
| 4,732,036 A | 3/1988 | Weeder | |
| 4,941,347 A * | 7/1990 | Iijima et al. | 73/116.02 |
| 4,951,498 A * | 8/1990 | Kiuchi | 73/116.02 |
| 5,027,647 A * | 7/1991 | Shimanaka | 73/115.02 |
| 5,097,699 A * | 3/1992 | Sano et al. | 73/115.01 |
| 5,101,660 A * | 4/1992 | La Belle | 73/118.01 |
| 5,341,674 A * | 8/1994 | Kunzfeld | 73/116.02 |
| 5,471,871 A * | 12/1995 | Rogers | 73/116.04 |
| 5,477,740 A * | 12/1995 | Shioya et al. | 73/862.191 |
| 5,537,865 A * | 7/1996 | Shultz | 73/115.02 |

(Continued)

FOREIGN PATENT DOCUMENTS

JP 61070438 A * 4/1986

*Primary Examiner*—Lisa M Caputo
*Assistant Examiner*—Freddie Kirkland, III
(74) *Attorney, Agent, or Firm*—Finnegan, Henderson, Farabow, Garrett & Dunner (57) ABSTRACT

A test system for a plurality of transmissions is disclosed. Each of the plurality of transmissions may have a transmission input member and a transmission output member. The test system may have a prime mover. The prime mover may have a prime mover output member configured to connect to the transmission input member of each of the plurality of transmissions. Additionally, the test system may have a plurality of inertia devices. Each of the inertia devices may be configured to connect to the transmission output member of one of the plurality of transmissions via a drive shaft. The test system may also have a controller. The controller may be configured to communicate with the prime mover and the plurality of transmissions to control a transfer of power between the plurality of transmissions.

20 Claims, 5 Drawing Sheets

U.S. PATENT DOCUMENTS

| | | | |
|---|---|---|---|
| 6,343,504 B1 * | 2/2002 | Shultz | 73/116.01 |
| 6,393,904 B1 * | 5/2002 | Krug et al. | 73/116.01 |
| 6,807,852 B2 * | 10/2004 | Ranchin | 73/116.01 |
| 6,820,472 B2 * | 11/2004 | Ranchin et al. | 73/116.01 |
| 6,860,145 B2 | 3/2005 | Bergst et al. | |
| 7,000,460 B1 * | 2/2006 | Cline et al. | 73/116.03 |
| 7,107,829 B2 * | 9/2006 | Tachiki | 73/115.01 |
| 7,289,892 B2 * | 10/2007 | Isogai et al. | 701/29 |

\* cited by examiner

MULTIPLE TRANSMISSION TEST SYSTEM AND METHOD

TECHNICAL FIELD

The present disclosure relates generally to a test system and, more particularly, to a system for testing multiple transmissions.

BACKGROUND

Many machines include a propulsion system with a multiple-ratio transmission operable to transmit power in a forward direction from a prime mover (such as an engine) to propulsion devices (such as wheels) at any of a plurality of optional drive ratios. Some multiple-ratio transmissions have a step-change configuration, meaning that the transmission has a finite set of discrete drive ratios at which it can transmit power. Other multiple-ratio transmissions, known as continuously variable transmissions, have a configuration allowing adjustment of the transmission's drive ratio through a continuous range. The advantages associated with continuously variable transmissions include the decoupling of the transmission input speed from the transmission output speed and the ability to rapidly adjust the drive ratio, the output speed, and the amount of torque output by the transmission. These advantages may help the propulsion system meet operator requests for abrupt changes in the travel speed of the machine. Furthermore, continuously variable transmissions can be used to regenerate power during machine braking. This regenerating of power includes transmitting power in a reverse direction from the propulsion devices through the continuously variable transmission to the prime mover. The regenerating of power may help reduce the emissions and the fuel consumption of the propulsion system.

Unfortunately, testing continuously variable transmissions is costly. Specifically, it is costly to test transmissions of power in the reverse direction. This is because existing test systems that transmit power in the reverse direction require at least one universal dynamometer (dynamometers capable of both providing and absorbing power) for each transmission simultaneously tested. Purchasing, leasing, and/or otherwise obtaining access to universal dynamometers requires significant capital investment. Moreover, operational and environmental costs of the universal dynamometers are high due to their large power consumption. In particular, the universal dynamometer either provides or absorbs a maximum testing power of the continuously variable transmissions.

One way to reduce the costs of testing transmissions is to reduce the capital investment in the test systems. An example of this strategy is described in U.S. Pat. No. 4,520,659 (the '659 patent) issued to Lucia et al. on Jun. 4, 1985. The '659 patent describes a transmission testing apparatus having at least one inertia flywheel with a shaft capable of being coupled to an output shaft of a transmission being tested. The transmission is mounted on a removable plate on an adjustable bulkhead supporting a prime mover, such as an internal combustion engine, that has an output shaft coupled to the input shaft of the transmission. The bulkhead is adjustably positionable such as to align the transmission output shaft with the inertia flywheel shaft. Alternatively, the apparatus comprises two upright members each provided with a shaft driven inertia flywheel, such that each of the output shafts of a transaxle transmission may be coupled to one of the two inertia flywheels. The transmission testing apparatus of the '659 patent may help reduce the capital investment in test systems by allowing for testing of multiple types of transmissions. Specifically, the transmission testing apparatus of the '659 patent can be configured to test straight through transmissions (transmissions with one input shaft and one output shaft) and transaxle transmissions (transmissions with one input shaft and two output shafts).

Although the testing apparatus of the '659 patent may allow for testing of multiple types of transmissions, the testing apparatus of the '659 patent may do little to allow for testing of multiple transmissions simultaneously. Additionally, though energy stored in the flywheels of the '659 patent may be used to drive the prime mover of the '659 patent via a transmission, this driving of the prime mover of the '659 patent may do little to reduce a maximum power consumption of the prime mover of the '659 patent.

The disclosed system and method are directed to overcoming one or more of the problems set forth above.

SUMMARY

In one aspect, the present disclosure may be directed to a test system for a plurality of transmissions. Each of the plurality of transmissions may include a transmission input member and a transmission output member. The test system may include a prime mover. The prime mover may include a prime mover output member configured to connect to the transmission input member of each of the plurality of transmissions. Additionally, the test system may include a plurality of inertia devices. Each of the inertia devices may be configured to connect to the transmission output member of one of the plurality of transmissions via a drive shaft. The test system may also include a controller. The controller may be configured to communicate with the prime mover and the plurality of transmissions to control a transfer of power between the plurality of transmissions.

In another aspect, the present disclosure may be directed to a method of simultaneously testing a plurality of transmissions. The method may include directing a flow of power through a first of the plurality of transmissions. Additionally, the method may include directing a flow of power through a second of the plurality of transmissions. The method may also include directing a flow of power between a prime mover and the first and the second of the plurality of transmissions.

In yet another aspect, the present disclosure may be directed to another method of simultaneously testing a plurality of transmissions. The method may include transferring power at a first magnitude from a prime mover to a first inertia device. This transfer of power may be via a first one of the plurality of transmissions. The method may also include transferring power at a second magnitude from the first inertia device to a second inertia device. This transfer of power may be via the first one of the plurality of transmissions and a second one of the plurality of transmissions.

DETAILED DESCRIPTION

Figure 1:
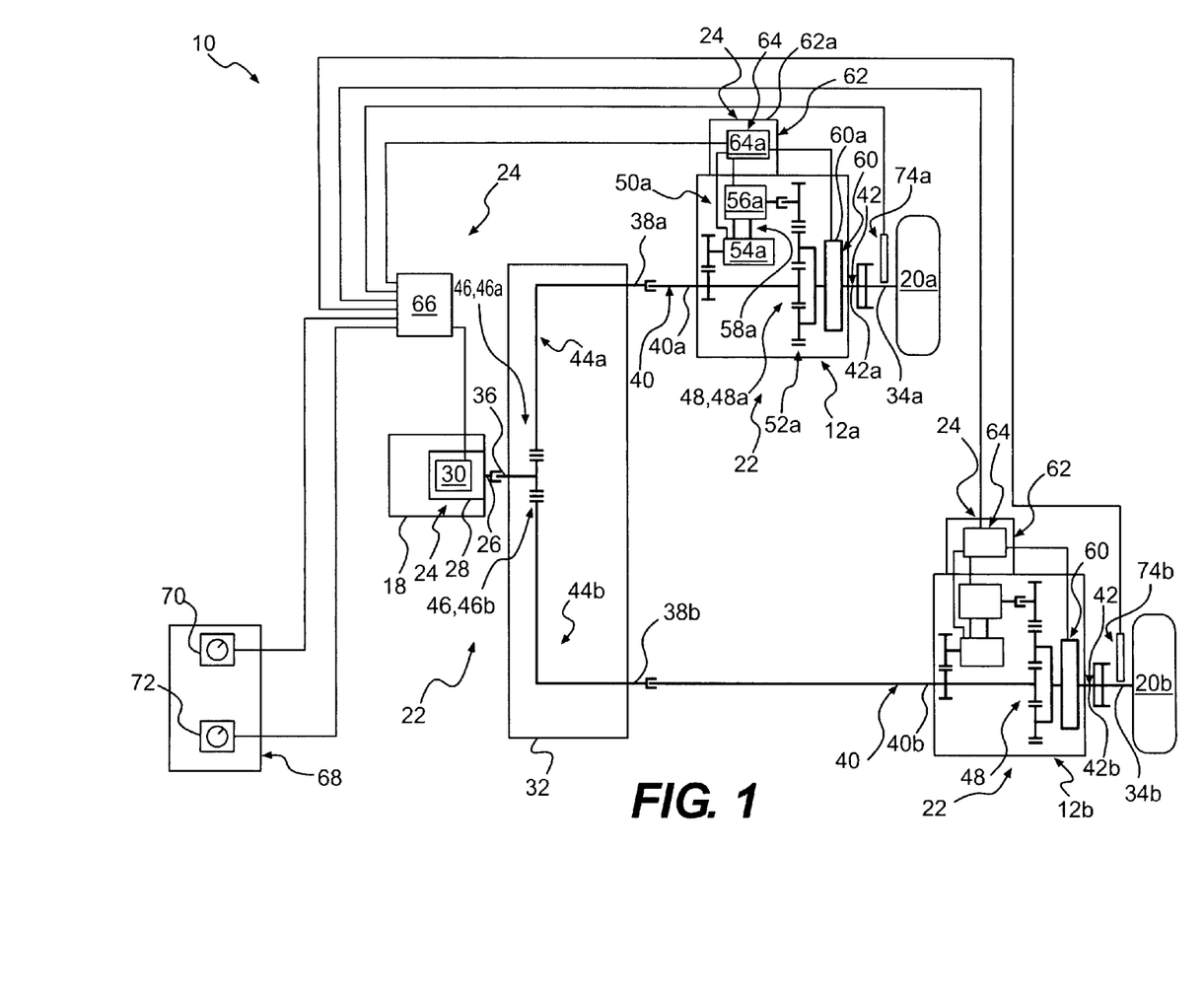
FIG. 1 is a diagrammatic illustration of a transmission test system.

FIG. 1 illustrates an exemplary transmission test system 10 (hereafter "test system 10") capable of simultaneously testing multiple transmissions 12a and 12b (hereafter "transmissions 12"). Test system 10 may include a prime mover 18, one or more inertia devices 20a and 20b (hereafter "inertia devices 20"), a drive train 22, and test-system controls 24. Prime mover 18 may be any type of component operable to provide power to or absorb power from inertia devices 20. For example, prime mover 18 may be a diesel engine, a gasoline engine, a gaseous-fuel-driven engine, an electric motor, an electric generator, or another component operable to provide power to or absorb power from inertia devices 20. In some embodiments, prime mover 18 may be a universal dynamometer. Specifically, prime mover 18 may be capable of providing a maximum power to inertia devices 20. This maximum power may be a maximum allowable power provision of prime mover 18. Prime mover 18 may also be capable of absorbing a maximum power from inertia devices 20. This maximum power may be a maximum allowable power absorption of prime mover 18. Prime mover 18 may have a rotary output member 26 for providing/absorbing power in rotary mechanical form. Prime mover 18 may also include prime mover controls 28. Prime mover controls 28 may include any component or components operable to control one or more operational aspects of prime mover 18. In some embodiments, prime mover controls 28 may include a prime mover controller 30 operatively connected to various sensors and/or actuators (not shown) for monitoring and controlling prime mover 18. Prime mover controller 30 may include one or more processors (not shown) and one or more memory devices (not shown).

Inertia devices 20 may include any type of components operable to simulate machine inertia by providing power to or absorbing power from one or more other components of test system 10. For example, as shown in FIG. 1, inertia devices 20 may include flywheels. Inertia devices 20 may also include various other types of devices in addition to, or in place of, flywheels, including, but not limited to, electrical and/or mechanical devices.

Drive train 22 may include any component or components operable to house transmissions 12 and transfer power from prime mover 18 to inertia devices 20 via transmissions 12. For example, drive train 22 may include a power transfer box 32 and drive shafts 34a and 34b (hereafter "drive shafts 34") connected between prime mover 18 and inertia devices 20. Power transfer box 32 may include any component or components operable to transfer power between prime mover 18 and transmissions 12, and/or between transmissions 12. For example, power transfer box 32 may include a rotary input member 36 and rotary output members 38a and 38b (hereafter "rotary output members 38"). Rotary input member 36 may connect directly or indirectly to rotary output member 26 of prime mover 18. Transmissions 12 may embody continuously variable transmissions and each may have a rotary input member 40 and a rotary output member 42. Specifically, transmission 12a may have a rotary input member 40a and a rotary output member 42a. And, transmission 12b may have a rotary input member 40b and a rotary output member 42b. Although FIG. 1 illustrates transmissions 12 as substantially identical, in some embodiments, transmissions 12 may be different. Rotary input members 40 may each connect directly or indirectly to rotary output members 38 of power transfer box 32. Drive shafts 34 may directly or indirectly connect rotary output members 42 to inertia devices 20.

Power transfer box 32 may have any configuration that allows transferring power between rotary input member 36 and rotary output members 38, and/or between rotary output members 38. In some embodiments, power transfer box 32 may have mechanical power-transfer paths 44a and 44b (hereafter "power-transfer paths 44") connected in parallel between rotary input member 36 and rotary output members 38. Mechanical power-transfer path 44a may include a gear set 46a connected between rotary input member 36 and rotary output member 38a. Mechanical power-transfer path 44b may include a gear set 46b connected between rotary input member 36 and rotary output member 38b. Alternatively, gear sets 46a and 46b (hereafter "gear sets 46") may be replaced by clutches, fluid couplers, gears, pulleys, belts, sprockets, or other power transfer devices known in the art. Although FIG. 1 illustrates gear sets 46 as symmetrical, in some embodiments, gear sets 46 may be asymmetrical. For example, gear sets 46 may be configured so that rotary output members 38 are not parallel to each other. Alternatively or additionally, gear sets 46 may be configured so that rotary output members 38 rotate in opposite directions and/or at varied speeds in response to rotations of rotary input member 36.

Each transmission 12 may have any configuration that allows transferring power between rotary input member 40 and rotary output member 42 (transmission 12a may transfer power between rotary input member 40a and rotary output member 42a and transmission 12b may transfer power between rotary input member 40b and rotary output member 42b), while varying the ratio of the speed of rotary input member 40 to the speed of rotary output member 42 through a continuous range. As FIG. 1 illustrates transmissions 12 as substantially identical, transmissions 12 will be described with reference to only transmission 12a. It should be understood, however, that any configurations described with reference to transmission 12a may be equally applicable to transmission 12b. In some embodiments, transmission 12a may have a mechanical power-transfer path 48a and a hydraulic power-transfer path 50a connected in parallel between rotary input member 40a and rotary output member 42a. Mechanical power-transfer path 48a may include a planetary gear set 52a connected between rotary input member 40a and rotary output member 42a. Rotary input member 40a may, for example, connect directly or indirectly to a sun gear of planetary gear set 52a, and a planet carrier of planetary gear set 52a may connect directly or indirectly to rotary output member 42a.

Hydraulic power-transfer path 50a may include a hydraulic pump 54a, a hydraulic motor 56a, and a fluid-transfer system 58a for delivering hydraulic fluid pumped by hydraulic pump 54a to hydraulic motor 56a. Fluid-transfer system 58a may include various conduits, valves, reservoirs, and/or other known hydraulics components. Hydraulic pump 54a may connect to rotary input member 40a. Hydraulic motor 56a may, for example, connect to the ring gear of planetary gear set 52a. This connection of rotary input member 40a, hydraulic motor 56a, and rotary output member 42a to planetary gear set 52a may make the speed of rotary input member 40a, the speed of hydraulic motor 56a, and the speed of rotary output member 42a interdependent.

Transmission 12a may also include a reverser mechanism 60a connected between planetary gear set 52a and rotary output member 42a. Reverser mechanism 60a may have one operating state that results in rotary output member 42a rotating in the same direction as rotary input member 40a, and another operating state that results in rotary output member 42*a* rotating in a direction opposite rotary input member 40*a*. Thus, one operating state of reverser mechanism 60*a* may allow propulsion of inertia device 20*a* in a clockwise direction, and another operating state of reverser mechanism 60*a* may allow propulsion of inertia device 20*a* in a counter-clockwise direction. Reverser mechanism 60*a* may have various combinations of power-transfer components, including, but not limited to, gears, pulleys, sprockets, chains, and/or clutches arranged in various manners.

Transmission 12*a* may also include transmission controls 62*a*. Transmission controls 62*a* may include any component or components operable to control one or more operational parameters of transmission 12*a*. Transmission controls 62*a* may, for example, include a transmission controller 64*a* operatively connected to various components of transmission 12*a*. Transmission controller 64*a* may include one or more processors (not shown) and one or more memory devices (not shown). Transmission controller 64*a* may be operatively connected to one or more components of hydraulic power-transfer path 50*a* in a manner enabling transmission controller 64*a* to control the speed and power output of hydraulic motor 56*a*. Transmission controller 64*a* may, for example, be operatively connected to hydraulic pump 54*a* and/or hydraulic motor 56*a* in a manner enabling transmission controller 64*a* to control a displacement of hydraulic pump 54*a* and/or a displacement of hydraulic motor 56*a*. By controlling the operating speed and power output of hydraulic motor 56*a*, transmission controller 64*a* may control the ratio of the speed of rotary input member 40*a* to the speed of rotary output member 42*a*, as well as the speed and torque output of rotary output member 42*a*. In other words, transmission controller 64*a* may control the power transferred through transmission 12*a*. Transmission controller 64*a* may also be operatively connected to reverser mechanism 60*a*, such that transmission controller 64*a* may control whether rotary output member 42*a* rotates in the same direction as, or in opposition to, rotary input member 40*a*.

Test-system controls 24 may include prime mover controls 28, transmission controls 62, a master controller 66, and an operator interface 68. Master controller 66 may be operatively connected to prime mover controls 28 and transmission controls 62. For example, master controller 66 may be communicatively linked to prime mover controller 30 and transmission controllers 64. These connections may allow master controller 66 to coordinate control of prime mover 18 and transmissions 12 by receiving information from and sending control commands to prime mover controller 30 and transmission controllers 64. For example, master controller 66 may control, via signals to prime mover 18 and transmissions 12, the rotational speeds and directions of inertia devices 20. Additionally, master controller 66 may control, via signals to prime mover 18 and transmissions 12, transfers of power between prime mover 18 and transmissions 12, and/or between transmission 12*a* and transmission 12*b*. These transfers of power may accelerate or decelerate the rotational speeds of inertia devices 20. Accelerate means changing from a first speed to a second speed, the second speed being further from zero than the first speed. Decelerate means changing from a first speed to a second speed, the second speed being closer to zero than the first speed.

Master controller 66 may include one or more processors (not shown) and one or more memory devices (not shown). Master controller 66 may receive information from various sources. In particular, master controller 66 may receive signals indicative of various parameters from various sources.

In some embodiments, master controller 66 may receive input from operator interface 68. Operator interface 68 may include one or more operator-input devices, for example, a max speed selector 70 and an ON/OFF selector 72. An operator of test system 10 may select, via max speed selector 70, a maximum speed at which the operator desires test system 10 to propel inertia devices 20. Max speed selector 70 may generate and communicate to master controller 66 a signal indicative of this maximum speed. The signal may also be indicative of a maximum amount of energy stored by inertia devices 20. This is because the speed of inertia devices 20 may be related to a kinetic energy of inertia devices 20. The operator of test system 10 may select the "ON" operating state of ON/OFF selector 72 to request propulsion of inertia device 20. Conversely, the operator may select the "OFF" operating state of ON/OFF selector 72 to request no propulsion of inertia device 20. ON/OFF selector 72 may generate and communicate to master controller 66 a signal indicative of the selected state of ON/OFF selector 72.

In addition to operator-input devices, various other components and/or systems may provide information to master controller 66. For example, speed/direction sensors 74*a* and 74*b* (hereafter "speed/direction sensors 74") may provide to master controller 66 signals indicating the rotational speeds of inertia devices 20, as well as whether inertia devices 20 are rotating in the clockwise or counter-clockwise directions. As changes in speed and direction may be related to power flows to and from inertia devices 20, these signals may also be indicative of magnitudes and directions of power flows to and from inertia devices 20. Master controller 66 may also receive signals from various other sensors (not shown), including, but not limited to, other speed/direction sensors, position sensors, pressure sensors, and/or temperature sensors. Alternatively or additionally, master controller 66 may also receive signals from various other controllers. For example, these signals may be indicative of test parameters such as requested powers, speeds, torques, and/or directions provided to or received from transmissions 12.

Figure 2:
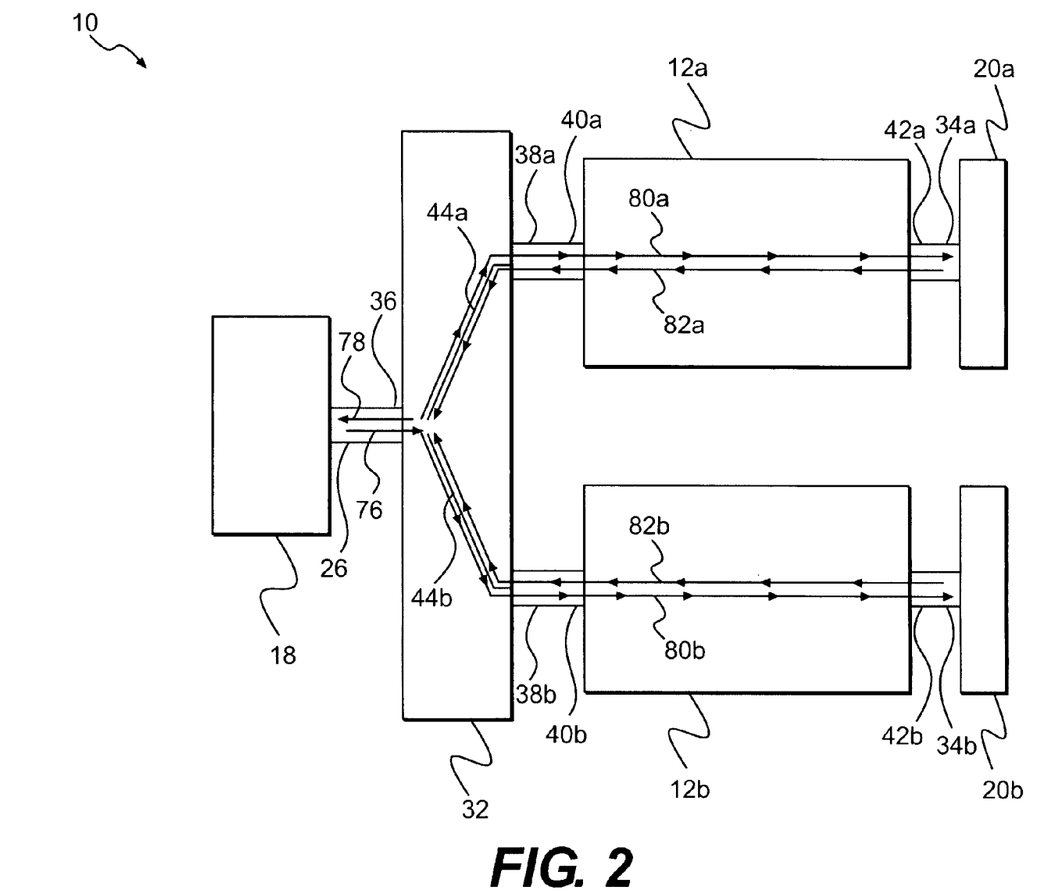
FIG. 2 is a diagrammatic illustration of exemplary disclosed power-transfer paths within the transmission test system of FIG. 1.

As illustrated in FIG. 2, power may flow in the directions of power-transfer paths 76, 78, 80*a*, 82*a*, 80*b*, and 82*b*. Any or all of power-transfer paths 76, 78, 80*a*, 82*a*, 80*b*, and 82*b* may intersect with each other within power transfer box 32. As previously discussed, power transfer box 32 may include power-transfer paths 44, which connect rotary input member 36 and rotary output members 38. Power-transfer paths 76 and 78 may connect prime mover 18 to power-transfer paths 44 via rotary output member 26 and rotary input member 36. In particular, while power-transfer path 76 may allow for a transfer of power from prime mover 18 to power transfer box 32, power-transfer path 78 may also allow for a transfer of power from power transfer box 32 to prime mover 18.

Although power-transfer paths 80 (power-transfer paths 80*a* and 80*b*) and power-transfer paths 82 (power-transfer paths 82*a* and 82*b*) are illustrated as overlapping power-transfer paths 44, it should be understood that this overlap is for purposes of illustrating relations between FIGS. 1 and 2. In some embodiments, power-transfer paths 44 may be subsumed by power-transfer paths 80 and 82. For example, power-transfer paths 80 and 82 may each connect power-transfer paths 76 and 78 to inertia devices 20 via rotary input member 36, rotary output members 38, rotary input members 40, transmissions 12, rotary output members 42, and drive shafts 34. In particular, while power-transfer paths 80 may allow for a transfer of power from power-transfer path 76 to inertia devices 20, power-transfer paths 82 may allow for a transfer of power from inertia devices 20 to power-transfer path 78. In other words, while each power-transfer path 80 may allow for a transfer of power from an input of one transmission 12 to an output of one transmission 12, each power-transfer path 82 may allow for a transfer of power from an output of one transmission 12 to an input of one transmission 12.

Alternatively, power-transfer paths 80 may connect power-transfer paths 82 to inertia devices 20. Conversely, power-transfer paths 82 may connect power-transfer paths 80 to inertia devices 20. For example, power-transfer path 80*a* may allow for a transfer of power from power-transfer path 82*b* to inertia device 20*a* via output member 38*a*, input member 40*a*, transmission 12*a*, output member 42*a*, and drive shaft 34*a*. As another example, power-transfer path 82*b* may allow for a transfer of power from inertia device 20*b* to power-transfer path 80*a* via drive shaft 34*b*, output member 42*b*, transmission 12*b*, input member 40*b*, and output member 38*b*. For a further example, power-transfer path 80*b* may allow for a transfer of power from power-transfer path 82*a* to inertia device 20*b* via output member 38*b*, input member 40*b*, transmission 12*b*, output member 42*b*, and drive shaft 34*b*. As yet another example, power-transfer path 82*a* may allow for a transfer of power from inertia device 20*a* to power-transfer path 80*b* via drive shaft 34*a*, output member 42*a*, transmission 12*a*, input member 40*a*, and output member 38*a*.

Figure 3:
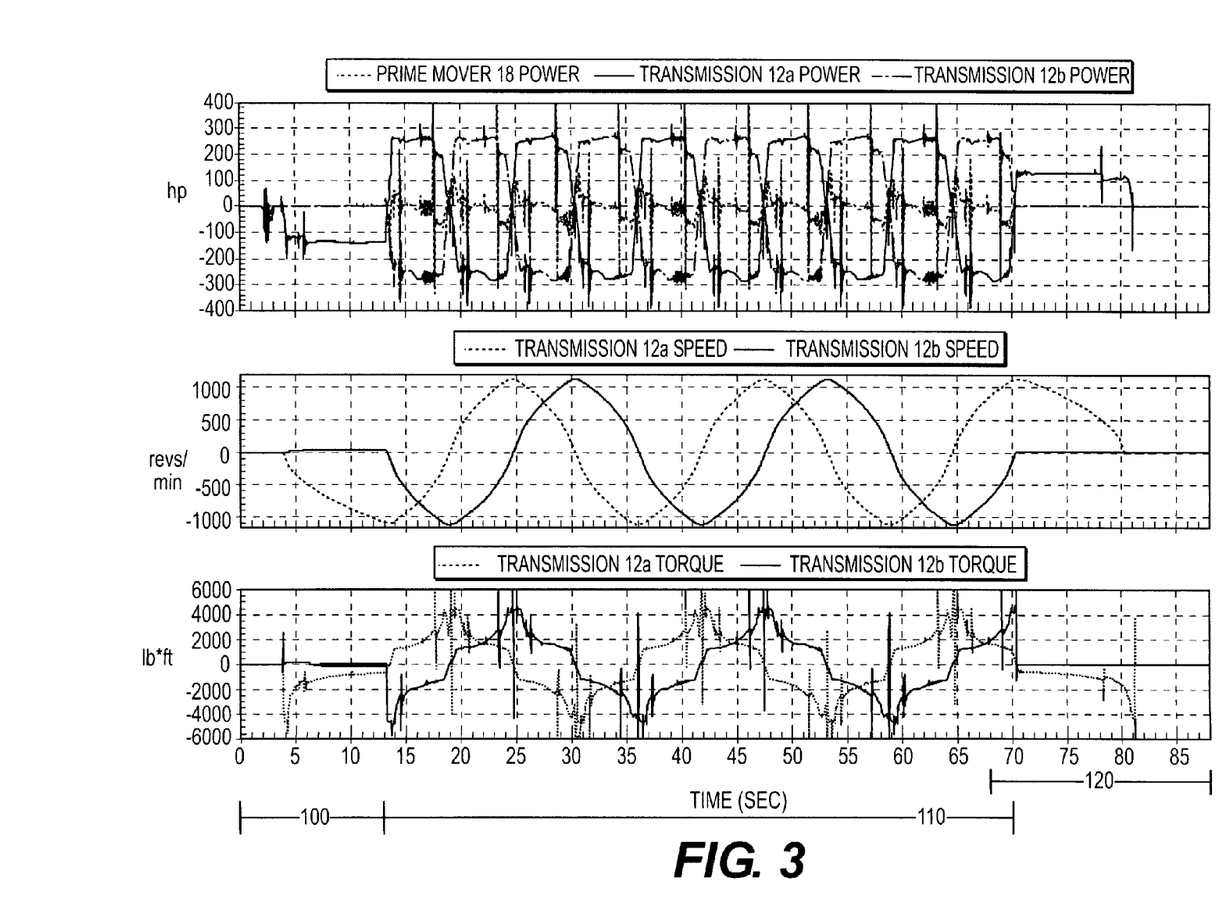
FIG. 3 is a graphical illustration of an exemplary disclosed transmission test using the transmission test system of FIG. 1.
Figure 4:
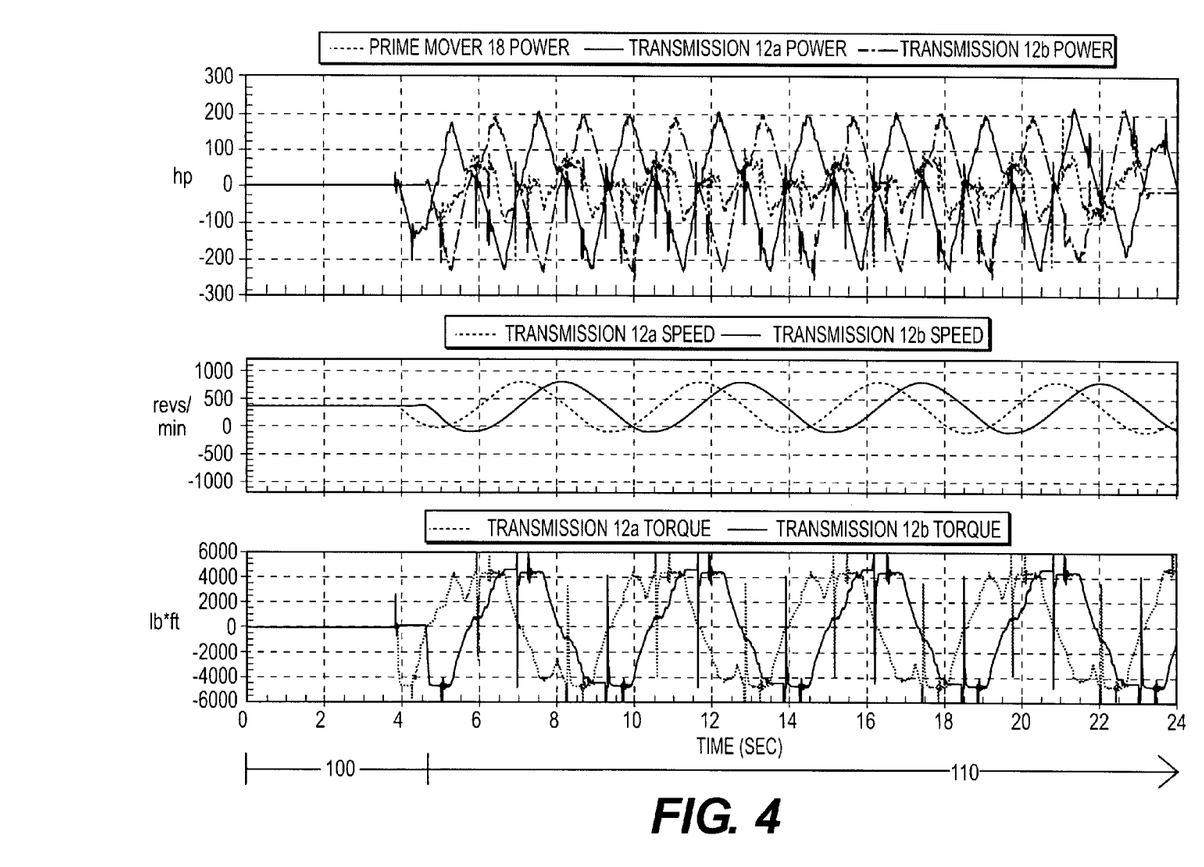
FIG. 4 is a graphical illustration of another exemplary disclosed transmission test using the transmission test system of FIG. 1.

By varying any and/or all of the above discussed transfers of power (hereafter "the transfers of power"), master controller 66 may test transmissions 12. As illustrated in FIG. 3, this test may include a startup cycle 100, an endurance cycle 110, and a shutdown cycle 120. FIG. 4 illustrates startup cycle 100 and endurance cycle 110 of another test of transmissions 12. The tests illustrated in FIGS. 3 and 4 differ in that the maximum speed at which the operator desires test system 10 to propel inertia devices 20 (hereafter the "maximum speed") is lower in the test of FIG. 4 than in the test of FIG. 3. This lower maximum speed yields a compressed test. Specifically, it should be noted that in the test of FIG. 3, accelerating inertia device 20*a* from substantially 0 revs/min to the maximum speed takes almost 10 seconds, while in the test of FIG. 4, accelerating inertia device 20*a* from substantially 0 revs/min to the maximum speed takes less than 2 seconds. Thus, while the test of FIG. 3 may be conducive to extended maximum speed testing, the test of FIG. 4 may be conducive to extended testing of moving parts of transmissions 12. As the tests of FIGS. 3 and 4 differ only in their maximum speed and compression, only FIG. 3 will be described in detail.

During startup cycle 100, master controller 66 may vary the transfers of power to accelerate inertia device 20*a* in the clockwise direction to the maximum speed (0 sec to 13 sec). As illustrated in the middle graph of FIG. 3, negative revs/min correspond to clockwise rotations, while positive revs/min correspond to counter-clockwise rotations. The top graph of FIG. 3 illustrates that the transfers of power to accelerate inertia device 20*a* may include flows of power in the directions of power-transfer paths 76 and 80*a* (referring to FIG. 2). Specifically, negative horse power (hp) corresponds to flows of power in the directions of power-transfer paths 76 and 80, while positive hp corresponds to flows of power in the directions of power-transfer paths 78 and 82 (referring to FIG. 2). It should be understood that these sign choices are exemplary only. In some embodiments, the transfers of power to accelerate inertia device 20*a* may include flows of power in the directions of power-transfer paths 78 and 82*a*. In other embodiments, the transfers of power to accelerate inertia device 20*a* may include flows of power in the directions of power-transfer paths 76 and 82*a* or power-transfer paths 78 and 80*a*. It should also be understood that the choice to accelerate inertia device 20*a* during startup cycle 100 (as opposed to inertia device 20*b*) is exemplary only. In some embodiments, inertia device 20*b* may be accelerated during startup cycle 100. Additionally, in some embodiments, inertia device 20 (inertia device 20*a* or 20*b*) may be accelerated in the counter-clockwise direction instead of the clockwise direction during startup cycle 100. The bottom graph of FIG. 3 illustrates that the transfers of power to accelerate inertia device 20*a* in the clockwise direction torque inertia device 20*a* in the clockwise direction. The relation between power, rotational speed, and torque is well known in the art and the graphs of FIG. 3 illustrate this relation: power=torque*rotational speed. As illustrated in the bottom graph of FIG. 3, negative torques correspond to clockwise torques and positive torques correspond to counter-clockwise torques.

During endurance cycle 110, master controller 66 may vary the transfers of power repeatedly to decelerate inertia device 20*a* in the clockwise direction, while accelerating inertia device 20*b* in the clockwise direction (13 sec to 19 sec, 36 sec to 42 sec, 59 sec to 64 sec); accelerate inertia device 20*a* in the counter-clockwise direction, while decelerating inertia device 20*b* in the clockwise direction (19 sec to 25 sec, 42 sec to 47 sec, 64 sec to 70 sec); decelerate inertia device 20*a* in the counter-clockwise direction, while accelerating inertia device 20*b* in the counter-clockwise direction (25 sec to 31 sec, 47 sec to 53 sec); and accelerate inertia device 20*a* in the clockwise direction, while decelerating inertia device 20*b* in the counter-clockwise direction (31 sec to 36 sec, 53 sec to 59 sec). The top graph of FIG. 3 illustrates that, during endurance cycle 110, little power is transferred from or to prime mover 18. Instead, significant power is transferred between transmissions 12. The power that is transferred from or to prime mover 18 may account for friction within test system 10 and/or transmissions 12. This power may also account for timing discrepancies between the test cycles of transmissions 12*a* and 12*b* and/or unresponsive power flows through transmissions 12 (all discussed in more detail below).

During shutdown cycle 120, master controller 66 may vary the transfers of power to decelerate inertia device 20*a* in the counter-clockwise direction to substantially 0 revs/min (68 sec to 88 sec). The top graph of FIG. 3 illustrates that the transfers of power to decelerate inertia device 20*a* in the counter-clockwise direction may include flows of power in the directions of power-transfer paths 78 and 82*a* (referring to FIG. 2). Similar to startup cycle 100, it should be understood that these transfers of power may vary based on sign choice. It should also be understood that the choice to decelerate inertia device 20*a* during shutdown cycle 120 (as opposed to inertia device 20*b*) is exemplary only. In some embodiments, inertia device 20*b* may be decelerated during shutdown cycle 120. Additionally, in some embodiments, inertia device 20 (inertia device 20*a* or 20*b*) may be decelerated in the clockwise direction during shutdown cycle 120.

Figure 5:
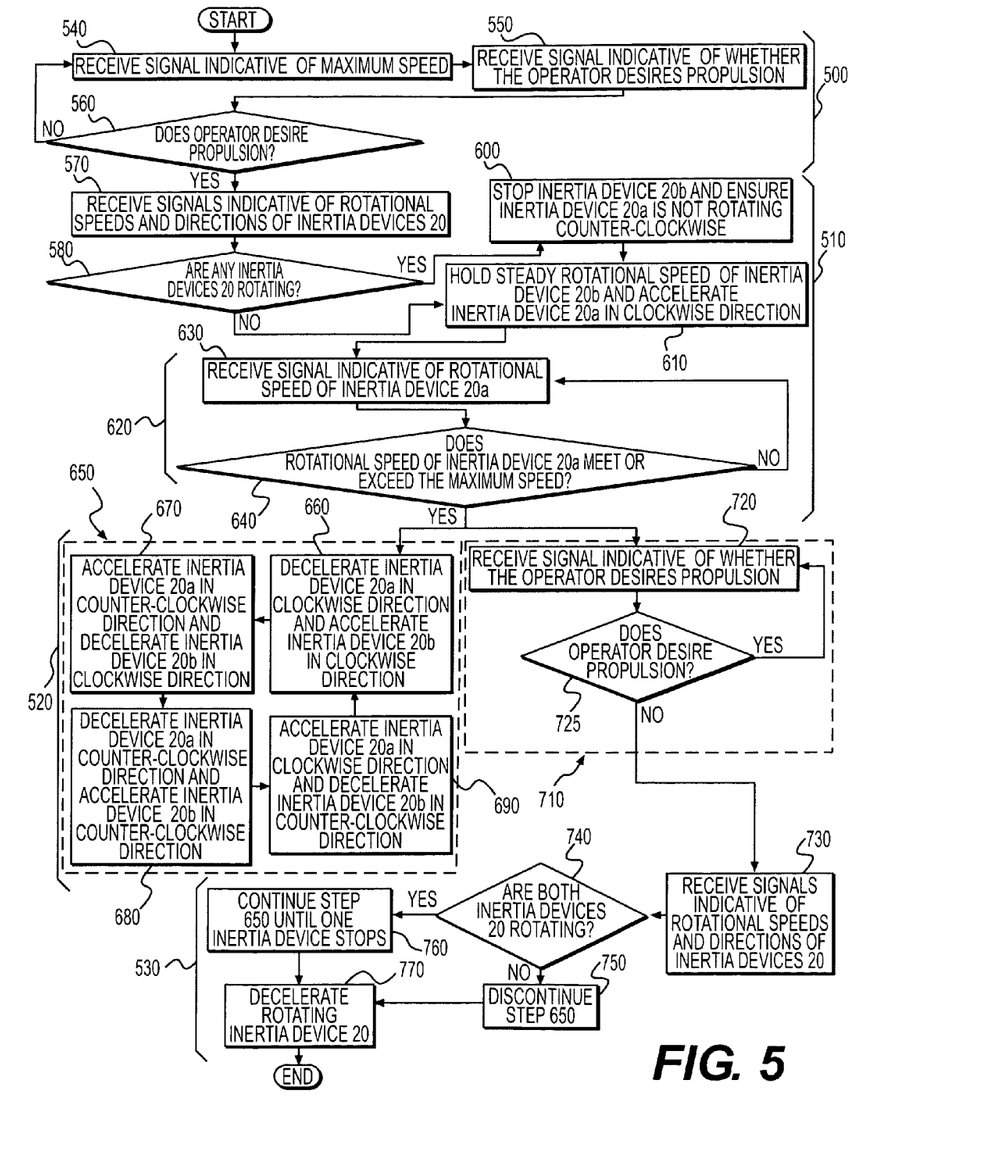
FIG. 5 is a flow chart describing an exemplary method of operating the transmission test system of FIG. 1 to perform the test of FIG. 3.

FIG. 5 illustrates an exemplary method of operating test system 10 to perform the test of FIG. 3. FIG. 5 will be discussed in the following section to further illustrate test system 10 and its operation.

Test system 10 is not limited to the configuration shown in FIG. 1. For example, test system 10 may be configured to simultaneously test more than two transmissions 12. As another example, transmission 12*a* may have a different configuration. Transmission 12*a* may include components not shown in FIG. 1, and/or transmission 12*a* may omit one or more of the components shown in FIG. 1. In some embodiments, transmission 12*a* may include provisions for discrete changes in the drive ratio within various portions of mechanical power-transfer path 48 and/or in other portions of transmission 12*a*. Additionally, in some embodiments, in place of hydraulic power-transfer path 50*a*, transmission 12*a* may have an electrical power-transfer path in parallel with mechanical power-transfer path 48a. Such an embodiment of transmission 12a may include an electric generator, an electric motor, and an electrical power-transfer circuit in place of hydraulic pump 54a, hydraulic motor 56a, and fluid-transfer system 58a, respectively.

Additionally, in some embodiments, transmission 12a may not have parallel power-transfer paths. For example, transmission 12a may have a single mechanical power-transfer path. Alternatively, transmission 12a may be a conventional hydrostatic transmission. Similarly, transmission 12a may include only an electrical power-transfer path that includes an electric generator connected directly or indirectly to rotary input member 40a and an electric motor connected directly or indirectly to rotary output member 42a.

INDUSTRIAL APPLICABILITY

The disclosed system may be applicable to transmissions. The system may simultaneously perform tests on multiple transmissions by directing power flows through each of the transmissions. In particular the system may direct power flows between a prime mover and the transmissions, and/or between each of the transmissions. Operation of the system will now be described.

As illustrated in FIG. 5, operation of test system 10 may commence at a step 500, which may include initialization of master controller 66. Based on this initialization, master controller 66 may, at a step 510, direct power flows in the directions of power-transfer paths 76, 78, 80a, 82a, 80b, and 82b (referring to FIG. 2) to perform startup cycle 100. Master controller 66 may also, at a step 520, direct power flows in the directions of power-transfer paths 76, 78, 80a, 82a, 80b, and 82b to perform endurance cycle 110. Additionally, master controller 66 may, at a step 530, direct power flows in the directions of power-transfer paths 76, 78, 80a, 82a, 80b, and 82b to perform shutdown cycle 120.

The power flows in the directions of power-transfer paths 76, 78, 80a, 82a, 80b, and 82b are discussed with reference to the following exemplary sign choices. Power flows in the direction of power-transfer path 76 include provisions of power by prime mover 18. Power flows in the direction of power-transfer path 78 include absorptions of power by prime mover 18. Power flows in the direction of power-transfer path 80a include absorptions of power by inertia device 20a. Power flows in the direction of power-transfer path 82a include provisions of power by inertia device 20a. Power flows in the direction of power-transfer path 80b include absorptions of power by inertia device 20b. Power flows in the direction of power-transfer path 82b include provisions of power by inertia device 20b.

The initialization of step 500 may include receiving input from the operator-input devices of operator interface 68 (referring to FIG. 1). In particular, master controller 66 may, at a step 540, receive from max speed selector 70 a signal indicative of the maximum speed (the maximum speed at which the operator desires test system 10 to propel inertia devices 20). Master controller 66 may, at a step 550, also receive from ON/OFF selector 72 a signal indicative of whether the operator desires propulsion of inertia device 20 (hereafter "desires propulsion"). If at a step 560 the signal from ON/OFF selector 72 indicates the operator desires propulsion, master controller 66 may proceed to step 510. Otherwise, master controller 66 may repeat step 500. Alternatively, master controller 66 may only repeat steps 550 and 560.

The performance of startup cycle 100 (step 510) may include accelerating inertia device 20a in the clockwise direction to the maximum speed. In particular, master controller 66 may, at a step 570, receive from speed/direction sensors 74 signals indicating the rotational speeds and directions of inertia devices 20. Based on these signals, master controller 66 may, at a step 580, determine whether any of inertia devices 20 are rotating. If the signals indicate that any of inertia devices 20 are rotating, master controller 66 may, at a step 600, direct power flows in the directions of power-transfer paths 76, 78, 80a, 82a, 80b, and 82b to stop inertia device 20b and ensure inertia device 20 is not rotating counter-clockwise. Otherwise, master controller 66 may, at a step 610, direct power flows in the directions of power-transfer paths 76, 78, 80a, 82a, 80b, and 82b to hold steady the rotational speed of inertia device 20b, while accelerating inertia device 20a in the clockwise direction. As previously discussed, in some embodiments inertia device 20a may instead be accelerated in the counter-clockwise direction. Master controller 66 may at a step 620, which may be concurrent with step 610, cease to accelerate inertia device 20a. Specifically, master controller 66 may, at a step 630, receive from speed/direction sensor 74a a signal indicative of the rotational speed of inertia device 20a. If at a step 640 the signal from speed/direction sensor 74a indicates the rotational speed of inertia device 20a meets or exceeds the maximum speed, master controller 66 may cease the directing of the power flows of step 610 and proceed to step 520. Otherwise, master controller 66 may repeat step 620.

The directing of the power flows of step 600 may vary depending on which inertia devices 20 are rotating and in what direction they are rotating. In particular, if inertia device 20b is rotating, master controller 66 may communicate with controller 30 and controller 64b to maximize the absorption of power by prime mover 18 from inertia device 20b. As power is transferred from inertia device 20b to prime mover 18 via power-transfer paths 78 and 82b, inertia device 20b may decelerate until reaching substantially 0 revs/min. Alternatively, master controller 66 may communicate with controller 64a and controller 64b to maximize the absorption of power by inertia device 20a from inertia device 20b. As power is transferred from inertia device 20b to inertia device 20a via power-transfer paths 80a and 82b, inertia device 20b may decelerate until reaching substantially 0 revs/min. Also, inertia device 20a may accelerate if either inertia device 20a is not moving or inertia device 20a is moving clockwise. Otherwise, inertia device 20a may decelerate in the counter-clockwise direction. In yet another alternative, master controller 66 may communicate with controller 30, controller 64a, and controller 64b to maximize the combined absorption of power by prime mover 18 and inertia device 20a. As power is transferred from inertia device 20b to prime mover 18 via power-transfer paths 78 and 82b, and from inertia device 20b to inertia device 20a via power-transfer paths 80a and 82b, inertia device 20b may decelerate until reaching substantially 0 revs/min and inertia device 20b may accelerate if either inertia device 20a is not moving or inertia device 20a is rotating clockwise. Otherwise, inertia device 20a may decelerate in the counter-clockwise direction. If either inertia device 20a is stopped or inertia device 20a is rotating in the clockwise direction, master controller 66 may proceed to step 610. Otherwise, master controller 66 may communicate with controller 30 and controller 64a to maximize the absorption of power by prime mover 18 from inertia device 20a. As power is transferred from inertia device 20a to prime mover 18 via power-transfer paths 78 and 82a, inertia device 20a may decelerate until reaching substantially 0 revs/min. Master controller 66 may then proceed to step 610.

The directing of the power flows of step 610 may include preventing any power flows in the directions of power-transfer paths 78, 80*b*, 82*a*, and 82*b*. The directing of the power flows of step 610 may, however, include increasing power flows in the directions of power-transfer paths 76 and 80*a*. In particular, master controller 66 may during step 610 communicate with controller 30 to maximize the provision of power by prime mover 18. This provision of power may or may not be the maximum allowable power provision of prime mover 18. Master controller 66 may also during step 610 communicate with controller 64*b* to prevent transmission 12*b* from allowing transfers of power from prime mover 18 to or from inertia device 20*b*. Additionally, master controller 66 may during step 610 communicate with controller 64*a* to allow transmission 12*a* to maximize transfers of power from prime mover 18 to inertia device 20*a* via power-transfer paths 76 and 80*a*.

The performance of endurance cycle 110 (step 520) may include repeatedly accelerating and decelerating inertia devices 20 to test transmissions 12. In particular, at a step 650, master controller 66 may direct power flows in the directions of power-transfer paths 76, 78, 80*a*, 80*b*, 82*a*, and 82*b* to test transmissions 12. The testing of step 650 may include, at a step 660, decelerating inertia device 20*a* in the clockwise direction, while accelerating inertia device 20*b* in the clockwise direction. Additionally, the testing of step 650 may include, at a step 670, accelerating inertia device 20*a* in the counter-clockwise direction, while decelerating inertia device 20*b* in the clockwise direction. The testing of step 650 may also include, at a step 680, decelerating inertia device 20*a* in the counter-clockwise direction, while accelerating inertia device 20*b* in the counter-clockwise direction. In addition, the testing of step 650 may include, at a step 690, accelerating inertia device 20*a* in the clockwise direction, while decelerating inertia device 20*b* in the counter-clockwise direction. During step 650, it is contemplated that the operator may at some point no longer desire propulsion. Thus, during a step 710, which may be concurrent with step 650, master controller 66 may, at a step 720, continuously receive from ON/OFF selector 72 a signal indicative of whether the operator desires propulsion. If at a step 725 the signal from ON/OFF selector 72 indicates the operator does not desire propulsion, master controller 66 may proceed to step 530. Otherwise, master controller 66 may repeat step 710.

The directing of the power flows of step 660 may include periodically receiving signals from various other components and/or systems. For example, master controller 66 may receive from speed/direction sensors 74 signals indicative of the rotational speeds and directions of inertia devices 20. As previously discussed, these signals may also be indicative of power flows to and from inertia devices 20. Specifically, the signals may be indicative of magnitudes of power flows in the directions of power-transfer paths 80*a*, 80*b*, 82*a*, and 82*b*. Based on the signals, master controller 66 may vary the magnitudes of power flows in the directions of power-transfer paths 76, 78, 80*a*, 80*b*, 82*a*, and 82*b*. In particular, master controller 66 may communicate with controller 64*a* to maximize the provision of power by inertia device 20*a* to power transfer box 32. As power is transferred from inertia device 20*a* to power transfer box 32 via power-transfer path 82*a*, inertia device 20*a* may decelerate in the clockwise direction until reaching substantially 0 revs/min. When inertia device 20*a* reaches substantially 0 revs/min, inertia device 20*a* may no longer provide power to power transfer box 32. Master controller 66 may also communicate with controller 64*b* to maximize the absorption of power by inertia device 20*b* from power transfer box 32. As power is transferred from power transfer box 32 to inertia device 20*b* via power-transfer path 80*b*, inertia device 20*b* may accelerate in the clockwise direction until reaching the maximum speed. When inertia device 20*b* reaches the maximum speed, master controller 66 may communicate with controller 64*b* to minimize the absorption of power by inertia device 20*b* from power transfer box 32. In other words, power transfer box 32 may no longer provide power to inertia device 20*b*. It is contemplated that when inertia device 20*a* reaches substantially 0 revs/min or when inertia device 20*b* reaches the maximum speed, master controller 66 may proceed to step 670. Alternatively, master controller 66 may not proceed to step 670 until inertia device 20*a* reaches substantially 0 revs/min and inertia device 20*b* reaches the maximum speed.

Similar to step 660, the directing of the power flows of step 670 may include periodically receiving signals indicative of the rotational speeds and directions of inertia devices 20. These signals may also be indicative of magnitudes of power flows in the directions of power-transfer paths 80*a*, 80*b*, 82*a*, and 82*b*. Based on the signals, master controller 66 may vary the magnitudes of power flows in the directions of power-transfer paths 76, 78, 80*a*, 80*b*, 82*a*, and 82*b*. In particular, master controller 66 may communicate with controller 64*b* to maximize the provision of power by inertia device 20*b* to power transfer box 32. As power is transferred from inertia device 20*b* to power transfer box 32 via power-transfer path 82*b*, inertia device 20*b* may decelerate in the clockwise direction until reaching substantially 0 revs/min. When inertia device 20*b* reaches substantially 0 revs/min, inertia device 20*b* may no longer provide power to power transfer box 32. Master controller 66 may also communicate with controller 64*a* to maximize the absorption of power by inertia device 20*a* from power transfer box 32. As power is transferred from power transfer box 32 to inertia device 20*a* via power-transfer path 80*a*, inertia device 20*a* may accelerate in the counter-clockwise direction until reaching the maximum speed. When inertia device 20*a* reaches the maximum speed, master controller 66 may communicate with controller 64*a* to minimize the absorption of power by inertia device 20*a* from power transfer box 32. In other words, power transfer box 32 may no longer provide power to inertia device 20*a*. It is contemplated that when inertia device 20*b* reaches substantially 0 revs/min or when inertia device 20*a* reaches the maximum speed, master controller 66 may proceed to step 680. Alternatively, master controller 66 may not proceed to step 680 until inertia device 20*b* reaches substantially 0 revs/min and inertia device 20*a* reaches the maximum speed.

Similar to steps 660 and 670, the directing of the power flows of step 680 may include periodically receiving signals indicative of the rotational speeds and directions of inertia devices 20. These signals may also be indicative of magnitudes of power flows in the directions of power-transfer paths 80*a*, 80*b*, 82*a*, and 82*b*. Based on the signals, master controller 66 may vary the magnitudes of power flows in the directions of power-transfer paths 76, 78, 80*a*, 80*b*, 82*a*, and 82*b*. In particular, master controller 66 may communicate with controller 64*a* to maximize the provision of power by inertia device 20*a* to power transfer box 32. As power is transferred from inertia device 20*a* to power transfer box 32 via power-transfer path 82*a*, inertia device 20*a* may decelerate in the counter-clockwise direction until reaching substantially 0 revs/min. When inertia device 20*a* reaches substantially 0 revs/min, inertia device 20*a* may no longer provide power to power transfer box 32. Master controller 66 may also communicate with controller 64*b* to maximize the absorption of power by inertia device 20*b* from power transfer box 32. As power is transferred from power transfer box 32 to inertia device 20*b* via power-transfer path 80*b*, inertia device 20*b* may accelerate in the counter-clockwise direction until reaching the maximum speed. When inertia device 20*b* reaches the maximum speed, master controller 66 may communicate with controller 64*b* to minimize the absorption of power by inertia device 20*b* from power transfer box 32. In other words, power transfer box 32 may no longer provide power to inertia device 20*b*. It is contemplated that when inertia device 20*a* reaches substantially 0 revs/min or when inertia device 20*b* reaches the maximum speed, master controller 66 may proceed to step 690. Alternatively, master controller 66 may not proceed to step 690 until inertia device 20*a* reaches substantially 0 revs/min and inertia device 20*b* reaches the maximum speed.

Similar to steps 660, 670, and 680, the directing of the power flows of step 690 may include periodically receiving signals indicative of the rotational speeds and directions of inertia devices 20. These signals may also be indicative of magnitudes of power flows in the directions of power-transfer paths 80*a*, 80*b*, 82*a*, and 82*b*. Based on the signals, master controller 66 may vary the magnitudes of power flows in the directions of power-transfer paths 76, 78, 80*a*, 80*b*, 82*a*, and 82*b*. In particular, master controller 66 may communicate with controller 64*b* to maximize the provision of power by inertia device 20*b* to power transfer box 32. As power is transferred from inertia device 20*b* to power transfer box 32 via power-transfer path 82*b*, inertia device 20*b* may decelerate in the counter-clockwise direction until reaching substantially 0 revs/min. When inertia device 20*b* reaches substantially 0 revs/min, inertia device 20*a* may no longer provide power to power transfer box 32. Master controller 66 may also communicate with controller 64*a* to maximize the absorption of power by inertia device 20*a* from power transfer box 32. As power is transferred from power transfer box 32 to inertia device 20*a* via power-transfer path 80*a*, inertia device 20*a* may accelerate in the clockwise direction until reaching the maximum speed. When inertia device 20*a* reaches the maximum speed, master controller 66 may communicate with controller 64*a* to minimize the absorption of power by inertia device 20*a* from power transfer box 32. In other words, power transfer box 32 may no longer provide power to inertia device 20*a*. It is contemplated that when inertia device 20*b* reaches substantially 0 revs/min or when inertia device 20*a* reaches the maximum speed, master controller 66 may proceed to step 660. Alternatively, master controller 66 may not proceed to step 660 until inertia device 20*b* reaches substantially 0 revs/min and inertia device 20*a* reaches the maximum speed.

It is contemplated that during steps 660, 670, 680, and 690, the magnitude of the power transferred in the directions of power-transfer paths 80 (hereafter the "power-transfer paths 80 magnitude") may not be equivalent to the magnitude of power transferred in the directions of power-transfer paths 82 (hereafter the "power-transfer paths 82 magnitude"). The power-transfer paths 80 magnitude may include the magnitude of the power transferred in the direction of power-transfer path 80*a* (hereafter the "power-transfer path 80*a* magnitude") and the power transferred in the direction of power-transfer path 80*b* (hereafter the "power-transfer path 80*b* magnitude"). And, the power-transfer paths 82 magnitude may include the magnitude of the power transferred in the direction of power-transfer path 82*a* (hereafter the "power-transfer path 82*a* magnitude") and the power transferred in the direction of power-transfer path 82*b* (hereafter the "power-transfer path 82*b* magnitude"). Therefore, the difference between the power-transfer paths 80 magnitude and the power-transfer paths 82 magnitude may be: (1) the sum of the power-transfer paths 82*a* and 82*b* magnitudes if the power-transfer paths 80*a* and 80*b* magnitudes are zero; (2) the sum of the power-transfer paths 80*a* and 80*b* magnitudes if the power-transfer paths 82*a* and 82*b* magnitudes are zero; (3) the difference between the power-transfer paths 80*a* and 82*b* magnitudes if the power-transfer paths 80*b* and 82*a* magnitudes are zero; or (4) the difference between the power-transfer paths 82*a* and 80*b* magnitudes if the power-transfer paths 82*b* and 80*a* magnitudes are zero.

The power-transfer paths 80 magnitude and the power-transfer paths 82 magnitude (hereafter "the differing magnitudes") may differ because of a time discrepancy between the testing cycles of transmissions 12. For example, during step 660, if inertia device 20*a* reaches substantially 0 revs/min before inertia device 20*b* reaches the maximum speed, inertia device 20*a* may provide no power to power transfer box 32. It is contemplated that this time discrepancy may be reduced by, as previously discussed, not proceeding to step 670 until inertia device 20*a* reaches substantially 0 revs/min and inertia device 20*b* reaches the maximum speed. This is because waiting to proceed to step 670 may synchronize the test cycles of transmissions 12. In other words, waiting to proceed to step 670 may prevent premature acceleration or deceleration of either inertia device 20*a* or inertia device 20*b*. The differing magnitudes may also differ because transmissions 12 may not be 100% efficient. In other words, some power may be lost as it is transferred through transmissions 12 in the directions of power-transfer paths 80*a*, 80*b*, 82*a*, and 82*b*. For example, this power may be lost due to friction within transmissions 12. Additionally, the differing magnitudes may differ because transmissions 12 may not effectively respond to communications from master controller 66. For example, master controller 66 may communicate with controller 64*a* to increase the power-transfer path 82*a* magnitude, but transmission 12*a* may fail to alter the power-transfer path 82*a* magnitude accordingly. This failure may be due to a mechanical or electrical malfunction within or without transmission 12.

When the differing magnitudes differ, master controller 66 may communicate with controller 30 to either absorb with or provide from prime mover 18 the difference between the differing magnitudes. This may counterbalance the difference between the differing magnitudes and prevent undesired changes to the magnitudes of the power flows in the directions of power-transfer paths 80*a*, 80*b*, 82*a*, and 82*b*. In particular, if the power-transfer paths 80 magnitude exceeds the power-transfer paths 82 magnitude, master controller 66 may communicate with controller 30 to transfer the difference between the differing magnitudes from prime mover 18 to power transfer box 32 via power-transfer path 76. It is contemplated, however, that the difference between the differing magnitudes may exceed the maximum allowable power provision of prime mover 18. In such a case, master controller 66 may communicate with controllers 64 to increase the power-transfer paths 82 magnitude and/or decrease the power-transfer paths 80 magnitude. These adjustments may reduce the difference between the differing magnitudes sufficiently to prevent the difference between the differing magnitudes from exceeding the maximum allowable power provision of prime mover 18. On the other hand, if the power-transfer paths 82 magnitude exceeds the power-transfer paths 80 magnitude, master controller 66 may communicate with controller 30 to transfer the difference between the differing magnitudes from power transfer box 32 to prime mover 18 via power-transfer path 78. It is contemplated, however, that the difference between the differing magnitudes may exceed the maximum allowable power absorption of prime mover 18. In such a case, master controller 66 may communicate with controllers 64 to decrease the power-transfer paths 82 magnitude and/or increase the power-transfer paths 80 magnitude. These adjustments may reduce the difference between the differing magnitudes sufficiently to prevent the difference between the differing magnitudes from exceeding the maximum allowable power absorption of prime mover 18.

The performance of shutdown cycle 120 (step 530) may include decelerating one or both inertia devices 20 to substantially 0 revs/min. In particular, master controller 66 may, at a step 730, receive from speed/direction sensors 74 signals indicative of the rotational speeds and directions of inertia devices 20. Based on these signals, master controller 66 may, at a step 740, determine whether both inertia devices 20 are rotating. If the signals indicate that both inertia devices 20 are not rotating (i.e., at least one inertia device 20 is not rotating), master controller 66 may, at a step 750, cease the directing of the power flows of step 650 (i.e., discontinue step 650). Otherwise, master controller 66 may, at a step 760, continue the directing of the power flows of step 650 until all but one inertia device 20 stops rotating. For example, if inertia device 20a is accelerating in the counter-clockwise direction and inertia device 20b is decelerating in the clockwise direction (step 670), master controller 66 may cease the directing of the power flows of step 650 when inertia device 20b reaches substantially 0 revs/min. Once the directing of the power flows of step 650 has ceased (by way of step 750 or step 760), master controller 66 may, at a step 770, decelerate any rotating inertia device 20 to substantially 0 revs/min. In particular, master controller 66 may direct power flows in the directions of power-transfer paths 76, 78, 80a, 80b 82a, and 82b to stop any rotating inertia device 20. For example, if inertia device 20a is rotating in the clockwise direction, master controller 66 may decelerate inertia device 20a in the clockwise direction until inertia device 20a reaches substantially 0 revs/min.

The directing of the power flows of step 770 may include preventing any power flows in the directions of power-transfer paths 76, 80a, and 80b. The directing of the power flows of step 610 may, however, include increasing power flows in the directions of power-transfer paths 78, 82a, and 82b. In particular, master controller 66 may communicate with controller 30 to maximize the absorption of power by prime mover 18. This absorption of power may or may not be the maximum allowable power absorption of prime mover 18. If master controller 66 is decelerating inertia device 20a, master controller 66 may also communicate with controller 64b to prevent transmission 12b from allowing transfers of power from inertia device 20a to inertia device 20b. Additionally, master controller 66 may communicate with controller 64a to allow transmission 12a to maximize transfers of power from inertia device 20a to prime mover 18 via power-transfer paths 78 and 82a. As previously discussed, these transfers of power may continue until inertia device 20a reaches substantially 0 revs/min.

It is contemplated that use of test system 10 may minimize capital, operational, and/or environmental costs associated with testing transmissions 12. In particular, capital costs associated with testing transmissions 12 may be reduced because one test system 10 may test multiple transmissions 12 simultaneously. Furthermore, test system 10 may not require investment in multiple prime movers 18. Instead, test system 10 may use inertia devices 20 to either absorb or provide power via transmissions 12 to each other or to prime mover 18. Additionally, prime mover 18 need not provide or absorb magnitudes of power sufficiently large to fully test transmissions 12. This is because the power provided or absorbed by prime mover 18 may be supplemented by power provided or absorbed by inertia devices 20. Together, prime mover 18 and inertia devices 20 may fully test transmissions 12. Thus, it is contemplated that test system 10 may not require investment in prime movers 18 that can provide or absorb magnitudes of power sufficiently large to fully test transmissions 12.

The supplementing of the power provided or absorbed by prime mover 18 with power provided or absorbed by inertia devices 20 may also reduce operational and/or environmental costs associated with testing transmissions 12. Specifically, during endurance testing of transmissions 12, prime mover 18 need only provide or absorb magnitudes of power sufficient to counteract differences in the power-transfer paths 80 and 82 magnitudes. Therefore, prime mover 18 need not consistently operate at peak levels and prime mover 18 need not consistently consume peak amounts of power. Thus, operational and/or environmental costs associated with power consumption may be reduced.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A test system for a plurality of transmissions, each of the plurality of transmissions having a transmission input member and a transmission output member, the test system comprising:
   a prime mover including a prime mover output member configured to connect to the transmission input member of each of the plurality of transmissions being tested;
   a plurality of inertia devices, each configured to connect to the transmission output member of one of the plurality of transmissions via a drive shaft; and
   a controller configured to communicate with the prime mover and the plurality of transmissions to control a transfer of power between the plurality of transmissions.

2. The test system of claim 1, further including a power transfer box configured to connect the transmission input member of each of the plurality of transmissions with the prime mover output member.

3. The test system of claim 2, wherein the transfer of power between the plurality of transmissions is via the power transfer box.

4. The test system of claim 1, wherein the controller is further configured to communicate with the prime mover and the plurality of transmissions to control a transfer of power from the prime mover to at least one of the plurality of transmissions.

5. The test system of claim 1, wherein the controller is further configured to communicate with the prime mover and the plurality of transmissions to control a transfer of power from at least one of the plurality of transmissions to the prime mover.

6. The test system of claim 1, wherein the controlling of the transfer of power between the plurality of transmissions includes controlling a ratio of a rotational speed of the transmission input member to a rotational speed of the transmission output member of each of the plurality of transmissions, the ratio being continuously variable.

7. A method of simultaneously testing a plurality of transmissions, comprising:
   directing a flow of power through a first of the plurality of transmissions being tested;

directing a flow of power through a second of the plurality of transmissions being tested; and directing a flow of power between a prime mover and the first and the second of the plurality of transmissions.

8. The method of claim 7, wherein:
the directing of the flow of power through the first of the plurality of transmissions includes:
directing the flow of power from an output of the first of the plurality of transmissions to an input of the first of the plurality of transmissions; and
directing the flow of power from the input of the first of the plurality of transmissions to the output of the first of the plurality of transmissions;
the directing of the flow of power through the second of the plurality of transmissions includes:
directing the flow of power from an output of the second of the plurality of transmissions to an input of the second of the plurality of transmissions; and
directing the flow of power from the input of the second of the plurality of transmissions to the output of the second of the plurality of transmissions; and
the method further includes:
sensing a magnitude and a direction of each of the flows of power through the first and the second of the plurality of transmissions; and
adjusting, based on the sensed magnitudes and the sensed directions of the flows of power through the first and the second of the plurality of transmissions, at least one of:
the flow of power through the first of the plurality of transmissions;
the flow of power through the second of the plurality of transmissions; and
the flow of power between the prime mover and the first and the second of the plurality of transmissions.

9. The method of claim 8, wherein when the flow of power through the first of the plurality of transmissions is from the output to the input and the flow of power through the second of the plurality of transmissions is from the output to the input, at least one of the flows of power through the first and the second of the plurality of transmissions is adjusted to prevent a sum of the magnitudes of the flows of power through the first and the second of the plurality of transmissions from exceeding a maximum allowable power absorption of the prime mover.

10. The method of claim 8, wherein when the flow of power through the first of the plurality of transmissions is from the input to the output and the flow of power through the second of the plurality of transmissions is from the input to the output, at least one of the flows of power through the first and the second of the plurality of transmissions is adjusted to prevent a sum of the magnitudes of the flows of power through the first and the second of the plurality of transmissions from exceeding a maximum allowable power provision of the prime mover.

11. The method of claim 8, wherein when the flow of power through the first of the plurality of transmissions is from the input to the output and the flow of power through the second of the plurality of transmissions is from the output to the input, at least one of the flows of power through the first and the second of the plurality of transmissions is adjusted to prevent a difference between the magnitudes of the flows of power through the first and the second of the plurality of transmissions from exceeding one of a maximum allowable power provision of the prime mover or a maximum allowable power absorption of the prime mover.

12. The method of claim 8, wherein when the flow of power through the first of the plurality of transmissions is from the output to the input and the flow of power through the second of the plurality of transmissions is from the input to the output, at least one of the flows of power through the first and the second of the plurality of transmissions is adjusted to prevent a difference between the magnitudes of the flows of power through the first and the second of the plurality of transmissions from exceeding one of a maximum allowable power provision of the prime mover or a maximum allowable power absorption of the prime mover.

13. The method of claim 8, further including preventing undesired changes to at least one of the magnitudes of the flows of power through the first and the second of the plurality of transmissions.

14. The method of claim 13, wherein when the magnitude of the flow of power through the first of the plurality of transmissions is substantially zero, at least one of the flow of power through the second of the plurality of transmissions and the flow of power between the prime mover and the first and the second of the plurality of transmissions is adjusted to prevent the magnitude of the flow of power through the first of the plurality of transmissions from changing until the flow of power through the second of the plurality of transmissions is substantially zero.

15. The method of claim 13, wherein when the magnitude of the flow of power through the second of the plurality of transmissions is substantially zero, at least one of the flow of power through the first of the plurality of transmissions and the flow of power between the prime mover and the first and the second of the plurality of transmissions is adjusted to prevent the magnitude of the flow of power through the second of the plurality of transmissions from changing until the flow of power through the first of the plurality of transmissions is substantially zero.

16. A method of simultaneously testing a plurality of transmissions, comprising:
transferring power at a first magnitude from a prime mover to a first inertia device via a first one of the plurality of transmissions being tested; and
transferring power at a second magnitude from the first inertia device to a second inertia device via the first one of the plurality of transmissions and a second one of the plurality of transmissions being tested.

17. The method of claim 16, wherein:
the first magnitude includes a maximum allowable power provision of the prime mover; and
the second magnitude exceeds the first magnitude.

18. The method of claim 16, further including transferring power at a third magnitude to the prime mover from one of the first inertia device via the first one of the plurality of transmissions or the second inertia device via the second one of the plurality of transmissions.

19. The method of claim 18, wherein:
the third magnitude includes a maximum allowable power absorption of the prime mover; and
the second magnitude exceeds the third magnitude.

20. The method of claim 16, wherein the transferring power at the first magnitude from the prime mover to the first inertia device includes accelerating a rotational speed of the first inertia device to a selected maximum speed.

* * * * *